(12) United States Patent
Zou

(10) Patent No.: US 11,075,481 B1
(45) Date of Patent: Jul. 27, 2021

(54) CONNECTOR ASSEMBLY

(71) Applicant: LOTES CO., LTD, Keelung (TW)

(72) Inventor: Xiao Le Zou, Keelung (TW)

(73) Assignee: LOTES CO., LTD, Keelung (TW)

( * ) Notice: Subject to any disclaimer, the term of this patent is extended or adjusted under 35 U.S.C. 154(b) by 0 days.

(21) Appl. No.: 16/944,601

(22) Filed: Jul. 31, 2020

(30) Foreign Application Priority Data

Mar. 27, 2020 (CN) .......................... 202010233780.X

(51) Int. Cl.
| | | |
|---|---|---|
| *H01R 13/58* | (2006.01) | |
| *H01R 13/516* | (2006.01) | |
| *H01R 24/60* | (2011.01) | |
| *H01R 13/405* | (2006.01) | |
| *H01R 13/514* | (2006.01) | |

(52) U.S. Cl.
CPC ......... *H01R 13/516* (2013.01); *H01R 13/405* (2013.01); *H01R 13/514* (2013.01); *H01R 24/60* (2013.01)

(58) Field of Classification Search
CPC .. H01R 13/405; H01R 13/514; H01R 13/516; H01R 24/60; H01R 24/62
USPC ................................................ 439/460, 463
See application file for complete search history.

(56) References Cited

U.S. PATENT DOCUMENTS

| | | | | |
|---|---|---|---|---|
| 6,565,388 | B1 * | 5/2003 | Van Woensel ....... | H01R 13/514 |
| | | | | 439/607.48 |
| 10,128,618 | B1 * | 11/2018 | Briant .................... | H01R 13/66 |
| 2018/0309215 | A1 * | 10/2018 | Harmon, III ......... | H01R 12/721 |
| 2019/0252833 | A1 * | 8/2019 | Li ......................... | H01R 12/707 |
| 2020/0350724 | A1 * | 11/2020 | Tai ....................... | H01R 13/514 |

FOREIGN PATENT DOCUMENTS

| | | |
|---|---|---|
| CN | 102683971 B | 10/2014 |
| CN | 110854611 A | 2/2020 |

* cited by examiner

*Primary Examiner* — Khiem M Nguyen
(74) *Attorney, Agent, or Firm* — Locke Lord LLP; Tim Tingkang Xia, Esq.

(57) ABSTRACT

A connector assembly includes a connector module, a first shell located outside the connector module, and a second shell injection-molded outside the first shell. The first shell has a first slot and a second slot in communication with each other, and a first fixing portion relatively close to the connector module and a second fixing portion. The second fixing portion has a first abutting surface forming a portion of the first slot and a second abutting surface forming a portion of the second slot. The second shell has at least a clip portion filled in the first slot and the second slot. The clip portion abuts the first abutting surface and the second abutting surface simultaneously. An included angle between a direction of the clip portion abutting the first abutting surface and a direction of the clip portion abutting the second abutting surface is less than 180 degrees.

10 Claims, 10 Drawing Sheets

A-A

CONNECTOR ASSEMBLY

CROSS-REFERENCE TO RELATED PATENT APPLICATION

This non-provisional application claims priority to and the benefit of, pursuant to 35 U.S.C. § 119(a), patent application Serial No. CN202010233780.X filed in China on Mar. 27, 2020. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a connector assembly, and particularly to a connector assembly having shells tightly combined.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Chinese Patent Application No. CN201911027709.X discloses an existing electronic module in which, in manufacturing, generally after multiple terminals are engaged in an insulating body, a shielding shell is framed outside the insulating body, and then an inner shell and an outer shell are provided outside the shielding shell by injection molding, thus providing an insulating holdable portion. Since the shielding shell is generally made of a metal material, and the inner shell and the outer shell are made of plastic material, when the inner shell and the outer shell are formed outside the shielding shell by injection molding, it is easy to generate openings between the inner shell and the shielding shell and between the outer shell and the shielding shell. Thus, the inner shell is provided with a groove, and the outer shell has a supporting portion accommodated in the groove. The supporting portion urges against the first fixing portion of the groove toward a direction close to the shielding shell, such that the opening is not easily generated between the inner shell and the shielding shell. Further, the supporting portion urges against the second fixing portion of the groove toward a direction away from the shielding shell, and the second fixing portion urges against the supporting portion toward the direction close to the shielding shell, such that the supporting portion further urges against the first fixing portion, thereby further ensuring that no opening is easily generated between the inner shell and the shielding shell.

However, a contact range of the supporting portion and the second fixing portion is small, and after multiple times of plugging and inserting, the supporting portion may easily slide out from the groove, and the first fixing portion loses the urging by the supporting portion toward the direction close to the shielding shell. Thus, the first fixing portion and the shielding shell may detach due to an outer force or due to cooling and shrinking, causing the opening to generate between the inner shell and the shielding shell, and the connector assembly has poor water proof characteristics. Further, dust or other objects may easily enter between the inner shell and the connector module, affecting the normal usage of the product, and affecting the appearance and quality of the product.

Therefore, a heretofore unaddressed need to design a new electrical connector exists in the art to address the aforementioned deficiencies and inadequacies.

SUMMARY

The present invention is directed to a connector assembly, in which a contact range of the clip portion and the second fixing portion is enlarged, and the clip portion simultaneously abuts two surfaces of the second fixing portion along two directions having an included angle less than 180 degrees, such that the clip portion does not move toward a direction away from the connector module, the clip portion stably abuts the first fixing portion, and no opening is generated between the first fixing portion and the connector module.

To achieve the foregoing objective, the present invention adopts the following technical solutions. A connector assembly includes: a connector module; a first shell, located outside the connector module, wherein the first shell has at least one first slot and at least one second slot, the first slot is in communication with the second slot, the first shell has a first fixing portion and a second fixing portion, the first fixing portion is close to the connector module relative to the second fixing portion, the second fixing portion has a first abutting surface and a second abutting surface, the first abutting surface forms a portion of the first slot, and the second abutting surface forms a portion of the second slot; and a second shell, injection-molded outside the first shell, wherein the second shell has at least a clip portion filled in the first slot and the second slot, the clip portion urges against the first fixing portion toward a direction close to the connector module, the clip portion abuts the first abutting surface and the second abutting surface simultaneously, and an included angle between a direction of the clip portion abutting the first abutting surface and a direction of the clip portion abutting the second abutting surface is less than 180 degrees.

In certain embodiments, the second shell has a combining portion integrally connected with the clip portion, and the combining portion abuts the connector module.

In certain embodiments, the second shell has a wrapping portion, the wrapping portion is located outside the first shell and has two ends respectively integrally connected to the clip portion and the combining portion, and the clip portion and the wrapping portion match and surround to wrap the second fixing portion.

In certain embodiments, the first shell has a front surface and a top wall perpendicular to each other, the first slot is formed by being concavely provided on the front surface, the second slot is formed by being concavely provided on the top wall, the first abutting surface is connected to the front surface, and the second abutting surface is connected to the top wall.

In certain embodiments, the connector module comprises an insulating body, a plurality of terminals and a metal shell, the terminals are fixedly provided on the insulating body, the insulating body is accommodated in the metal shell, the first shell is injection-molded outside the metal shell, the first fixing portion abuts the metal shell, and the second shell partially abuts the metal shell.

In certain embodiments, the metal shell has a base and a mating portion configured to be inserted to a mating connector, an outer diameter of the base is greater than an outer diameter of the mating portion, a step portion connects the base and the mating portion, the step portion is provided obliquely relative to the mating portion, and the clip portion pushes the first fixing portion to urge against the step portion.

In certain embodiments, the first fixing portion has a guide surface, the clip portion abuts the guide surface, and an included angle between the step portion and the mating portion is greater than an included angle between the guide surface and the mating portion.

In certain embodiments, the included angle between the direction of the clip portion abutting the first abutting portion and the direction of the clip portion abutting the second abutting portion is an acute angle.

In certain embodiments, the first shell has a third fixing portion integrally connected to the first fixing portion, the third fixing portion has a third abutting portion provided obliquely toward a direction close to the second shell, the third abutting surface forms a portion of the second slot, and the clip portion urges against the third abutting surface toward a direction close to the connector module.

In certain embodiments, the first fixing portion has a guide surface, the third fixing portion has a transition portion connected to the first fixing portion, the transition portion connects the third abutting surface and the guide surface, the third abutting surface and the guide surface are on a same plane, and the guide surface and the first abutting surface are provided toward a direction away from the third abutting portion and obliquely away from each other.

Compared with the related art, the connector assembly according to certain embodiments of the present invention has the following beneficial effects. The second fixing portion has a first abutting surface and a second abutting surface. The clip portion abuts the first abutting surface and the second abutting surface simultaneously. The contact range of the clip portion and the second fixing portion is enlarged, and the clip portion simultaneously abuts the second fixing portion along two directions having an included angle less than 180 degrees. In contrast, the second fixing portion limits the position of the clip portion from the two directions having an included angle less than 180 degrees. Thus, the second fixing portion may better stop the clip portion from moving toward a direction away from the connector module. The clip portion is not easily detached from the first slot and the second slot, and the clip portion may stably urge against the first fixing portion, such that no opening is easily generated between the first fixing portion and the connector module, dust or other objects do not easily enter between the first shell and the connector module to affect the normal usage of the product, and the connector assembly has good water proof characteristics, enhancing the appearance and quality of the product.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
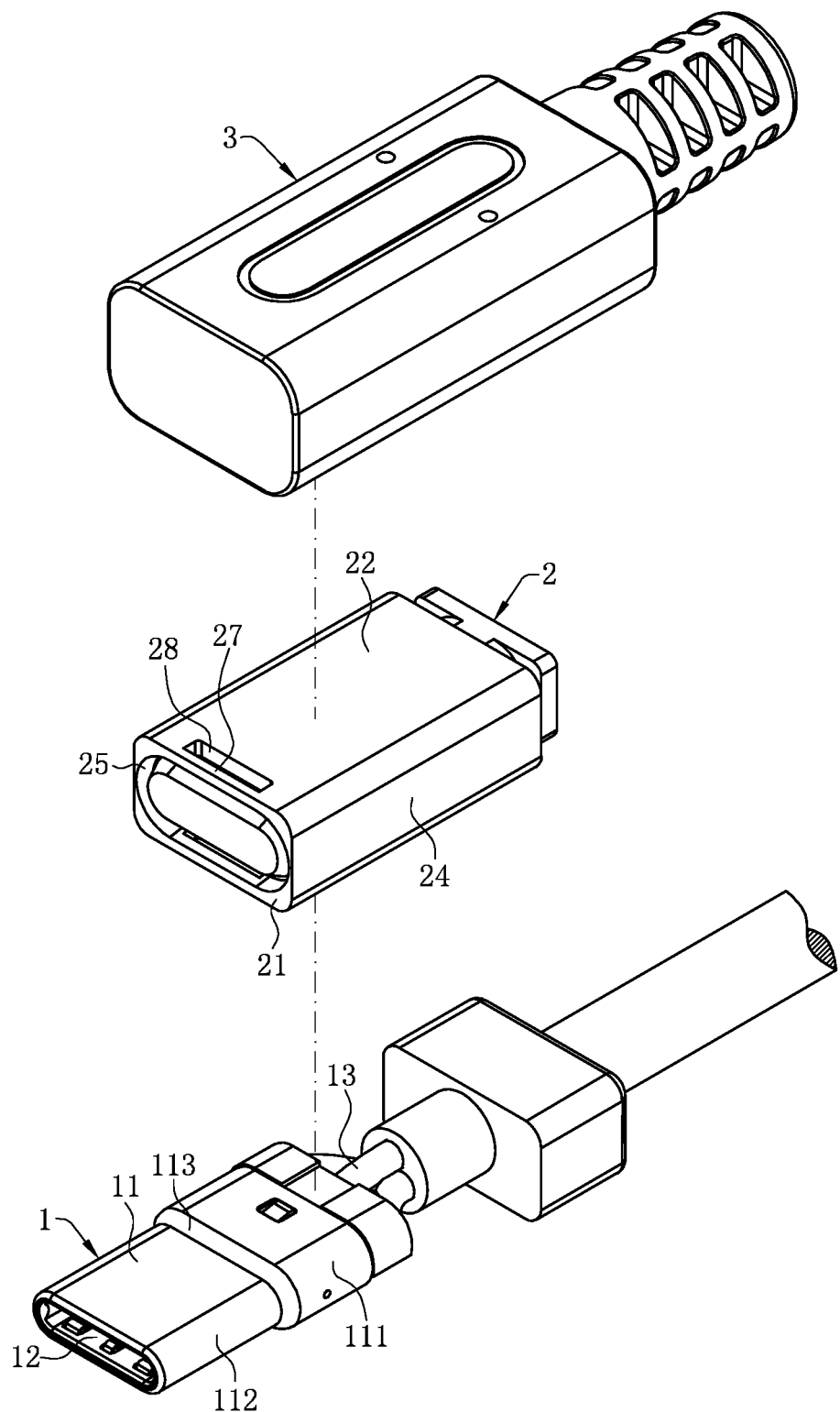
FIG. 1 is a perspective exploded view of a connector assembly according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-10. In accordance with the purposes of this invention, as embodied and broadly described herein, this invention, in one aspect, relates to a connector assembly 100.

Figure 6:
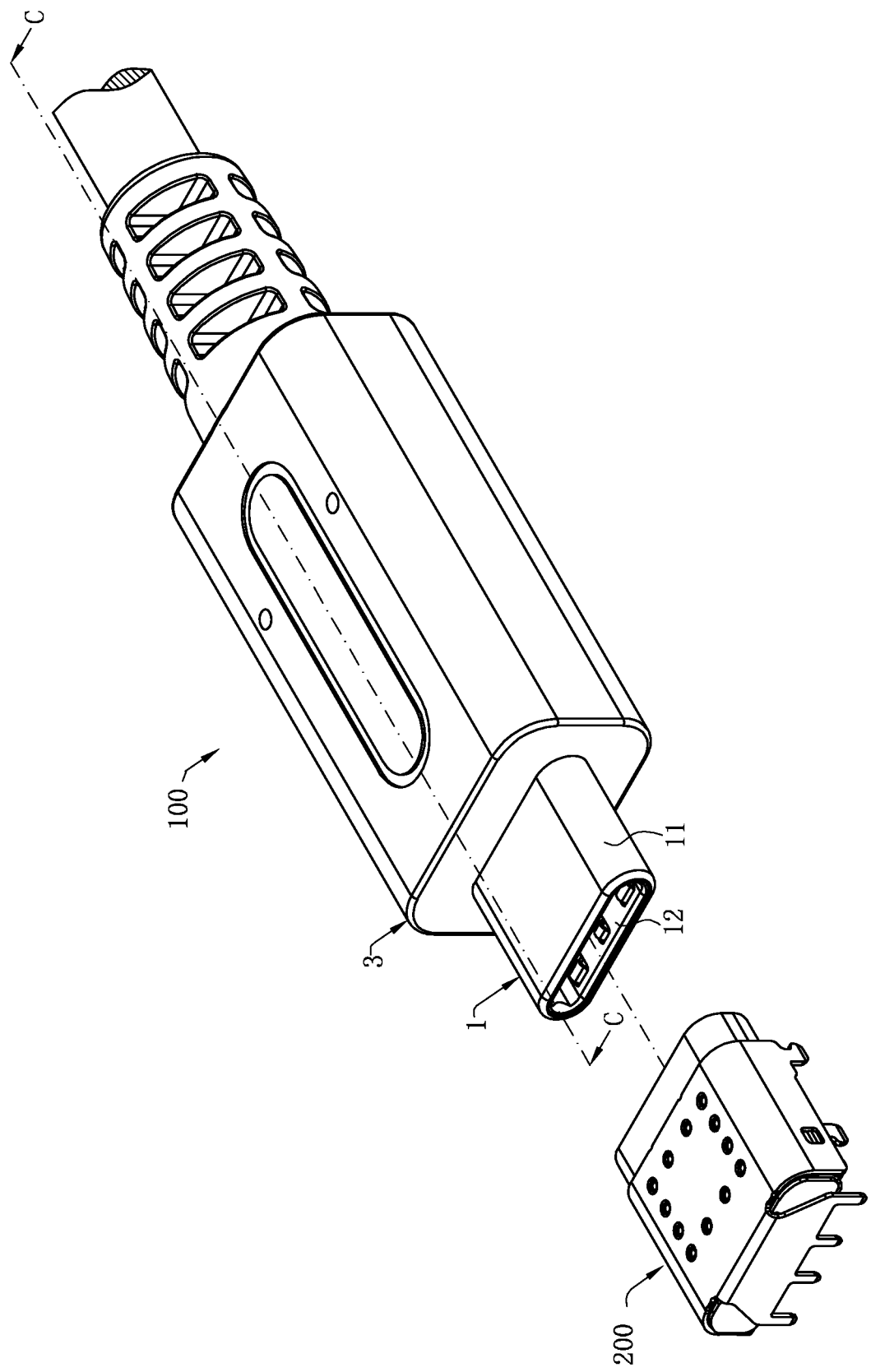
FIG. 6 is a perspective view of a second shell formed outside a connector module according to certain embodiments of the present invention.
Figure 10:
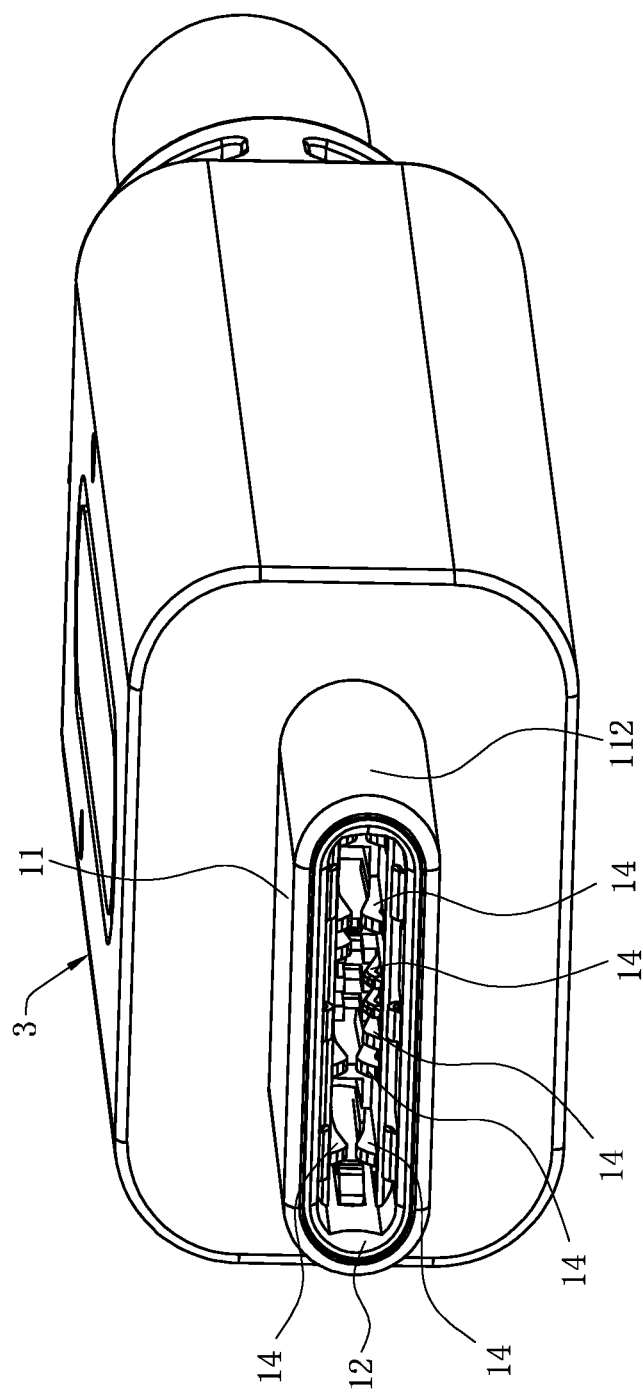
FIG. 10 is a perspective view of the connector assembly according to certain embodiments of the present invention.

As shown in FIG. 1, FIG. 6 and FIG. 10, the connector assembly 100 includes a connector module 1, a first shell 2 and a second shell 3. In this embodiment, the connector module 1 includes an insulating body 12, a plurality of terminals 14, a metal shell 11 and a cable 13. The terminals 14 are fixedly provided in the insulating body 12, and are electrically connected to the cable 13. The insulating body 12 is accommodated in the metal shell 11. The metal shell 11 includes a base 111 and a mating portion 112 extending from the base 111 and configured to mate with a mating connector 200. An outer diameter of the base 111 is greater than an outer diameter of the mating portion 112. A step portion 113 connects the base 111 and the mating portion 112. The step portion 113 is provided obliquely relative to the mating portion 112. A location connecting each terminal 14 and the cable 13 is located on the base 111. In the connector module 1 according to certain embodiments of the present invention, the circuit board is omitted, such that the overall length of the connector module 1 is reduced. In other embodiments, the connector module 1 may be other electrical connecting devices.

Figure 2:
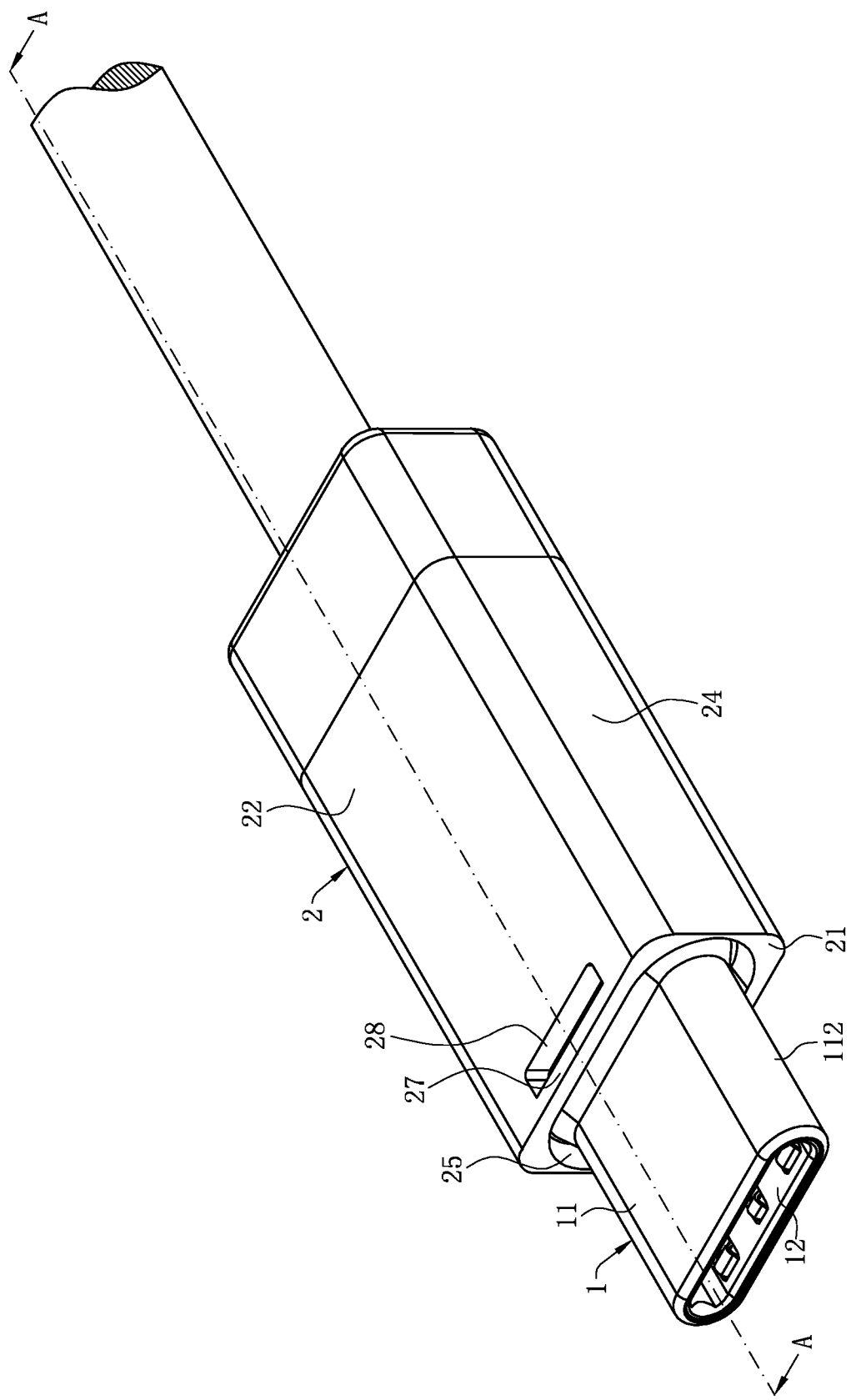
FIG. 2 is a perspective view of a first shell formed outside a connector module according to certain embodiments of the present invention.
Figure 3:
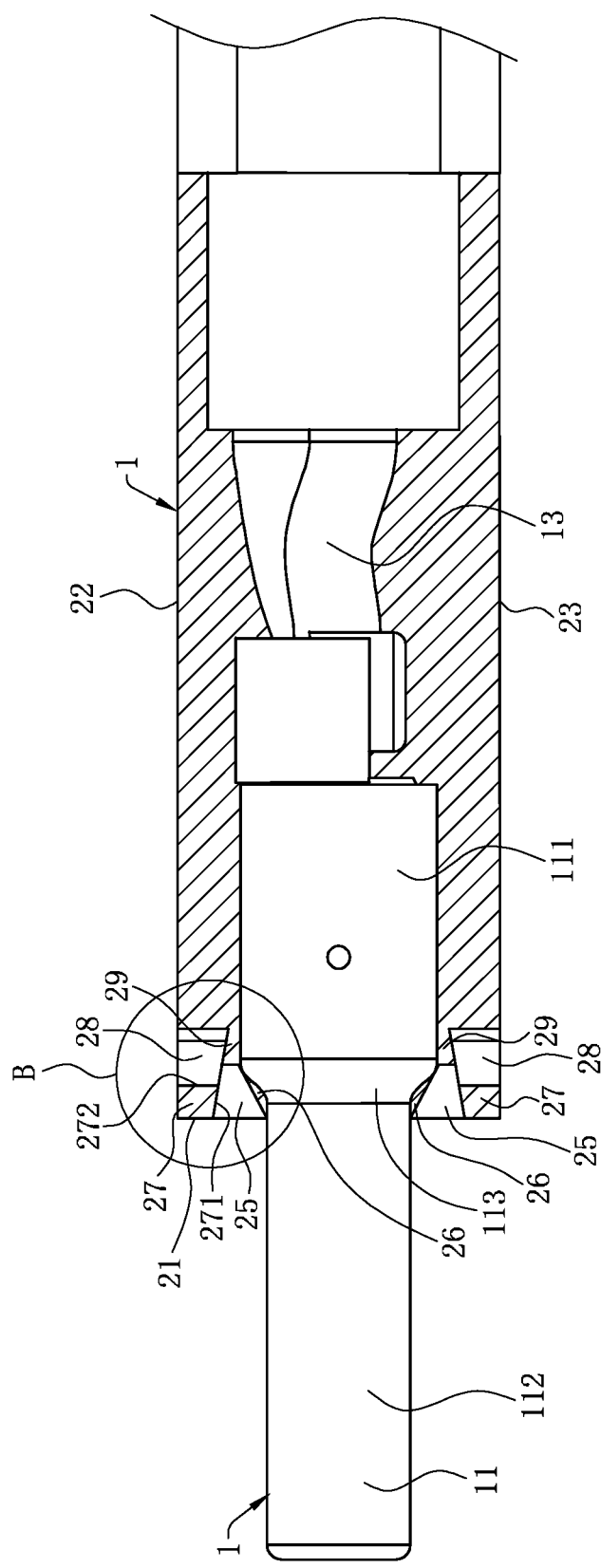
FIG. 3 is a sectional view of the first shell in FIG. 2 along line A-A.
Figure 4:
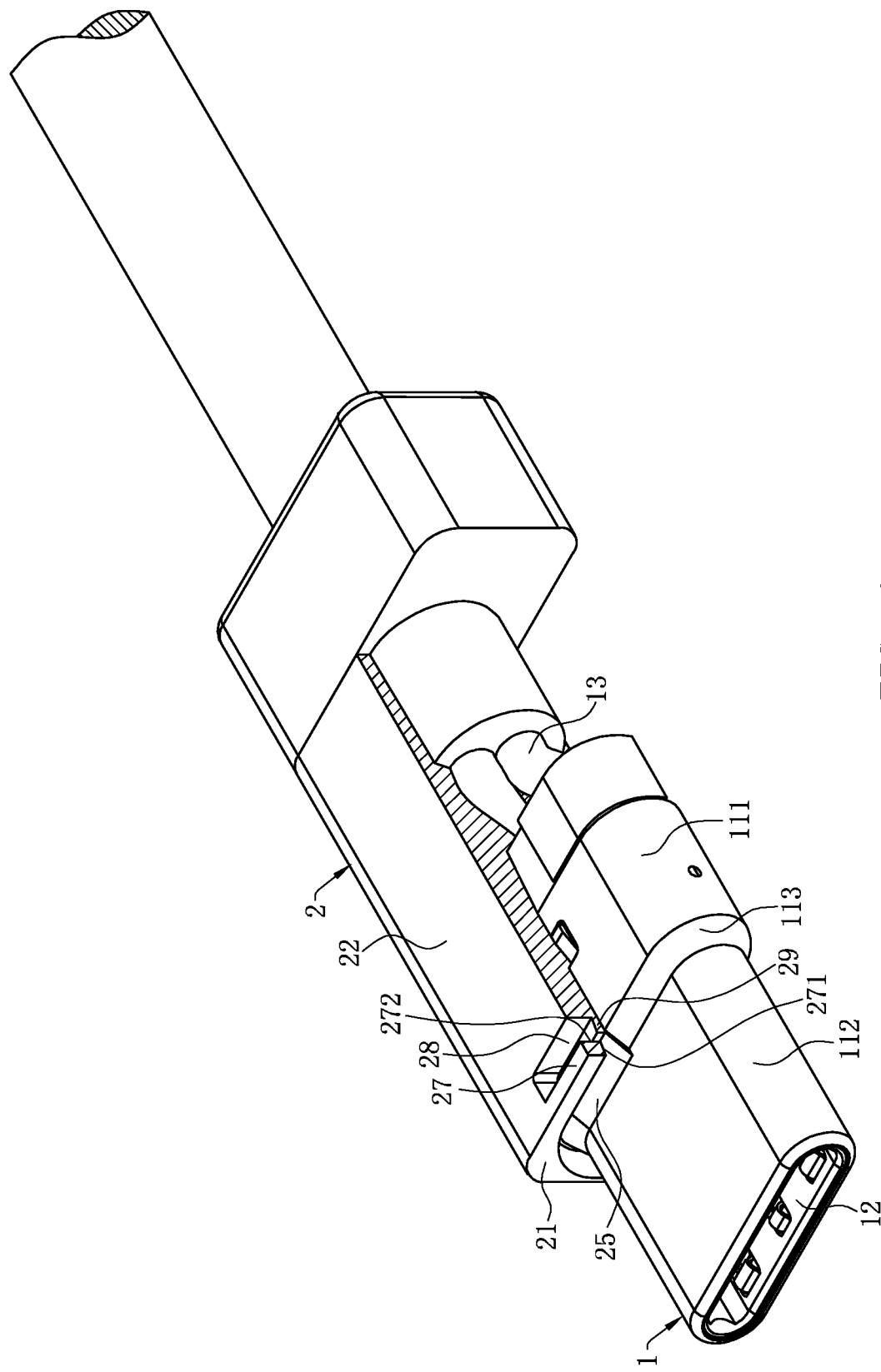
FIG. 4 is a perspective view of FIG. 3.

As shown in FIG. 2 to FIG. 4, the first shell 2 is firstly wrapped and injection molded outside the connector module 1. In other embodiments, the first shell 2 may be assembled and located outside the connector module 1. One end of the first shell 2 facing the mating portion 112 is a front end, and another end of the first shell 2 opposite to the front end is a back end. The front end of the first shell 2 is formed in front of a front end of the step portion 113 to form a front surface 21. The first shell 2 is concavely provided with a first slot 25 from the front surface 21 toward the back end. The first slot 25 surrounds outside the connector module 1. The first shell 2 has a first fixing portion 26 abutting the connecting module 1. The first slot 25 is formed outside the step portion 113, ensuring any location between the first slot 25 and the step portion 113 to have the first fixing portion 26 abutting the step portion 113. The step portion 113 is a curved surface expanded obliquely from the mating portion 112 toward the base 111. Thus, the first shell 2 may better wrap the step portion 113 in the injection-molding process. In other embodiments, the first slot 25 may be two or more separate slots. The first shell 2 has a top wall 22 and a bottom wall 23 connecting the front end and the back end, and two side walls 24 connecting the top wall 22 and the bottom wall 23. The top wall 22 and the bottom wall 23 are provided opposite to each other. Each of the top wall 22 and the bottom wall 23 is concavely provided with a second slot 28. The second slots 28 are in communication with the first slot 25. In other embodiments, the second slot 28 may be concavely provided only on the top wall 22, or may be concavely provided only on the bottom wall 23, or may be concavely provided on each of the two side walls 24, or may be concavely provided only on one of the two side walls 24.

Figure 5:
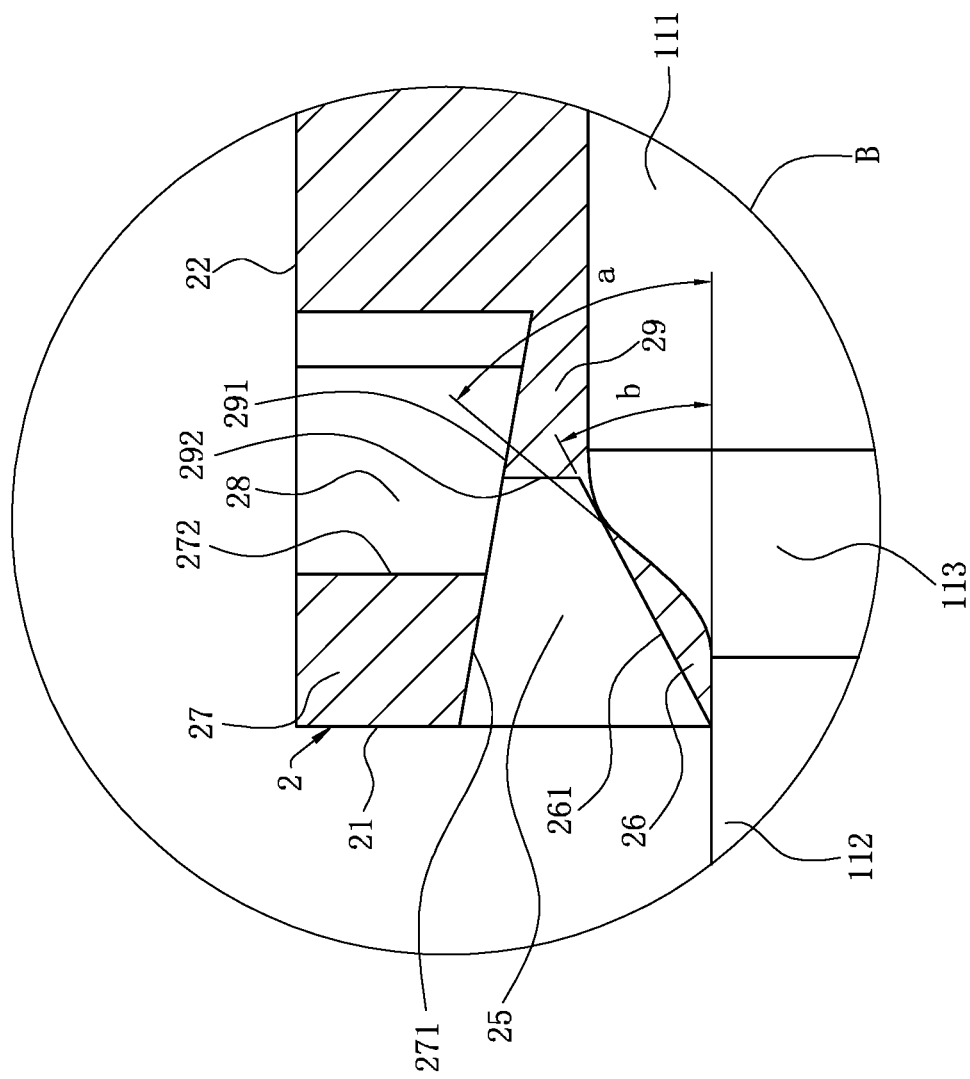
FIG. 5 is an enlarged view of a portion B in FIG. 3.

As shown in FIG. 3 to FIG. 5, using an example where the first slot 25 is concavely provided on the front surface 21 of the first shell 2 and surrounds outside the connector module 1 and the second slot 28 is concavely provided only on the top wall 22 of the first shell 2, the first shell 2 has a first fixing portion 26 and a second fixing portion 27. The first fixing portion 26 is close to the connector module 1 relative to the second fixing portion 27. The first fixing portion 26 abuts the step portion 113. The first portion 26 has a guide surface 261 forming a portion of the first slot 25. An included angle a between the step portion 113 and the mating portion 112 is greater than an included angle b between the guide surface 261 and the mating portion 112. The included angle a between the step portion 113 and the mating portion 112 is greater, that is, a length of a horizontal projection of the step portion 113 is shorter, which facilitates reducing the overall length of the connector module 1. Further, the included angle a between the step portion 113 and the mating portion 112 is greater than the included angle b between the guide surface 261 and the mating portion 112, facilitating that a space is outside the step portion 113 to accommodate the first fixing portion 26 abutting the step portion 113 on the premise that the first slot 25 has a greater volume.

As shown in FIG. 3 to FIG. 5, the first shell 2 has a second fixing portion 27. The second fixing portion 27 has a first abutting surface 271 and a second abutting surface 272. The first abutting surface 271 forms a portion of the first slot 25, and the second abutting surface 272 forms a portion of the second slot 28. In other embodiments, the first abutting surface 271 and the second abutting surface 272 may also be curved surfaces. The first shell 2 further has a third fixing portion 29 integrally connected to the first fixing portion 26. The third fixing portion 29 has a third abutting surface 291 provided obliquely toward a direction close to the second shell 3. The third abutting surface 291 forms a portion of the second slot 28.

As shown in FIG. 6, the second shell 3 is then wrapped and injection-molded outside the connector module 1 and the first shell 2. By successively wrapping and injection-molding the first shell 2 and the second shell 3 outside the connector module 1, the volume of the plastic formed by each injection-molding is reduced, such that uneven plastic injection pressure does not occur in each injection-molding, reducing the defect rate of the product without affecting the normal usage of the user.

Figure 7:
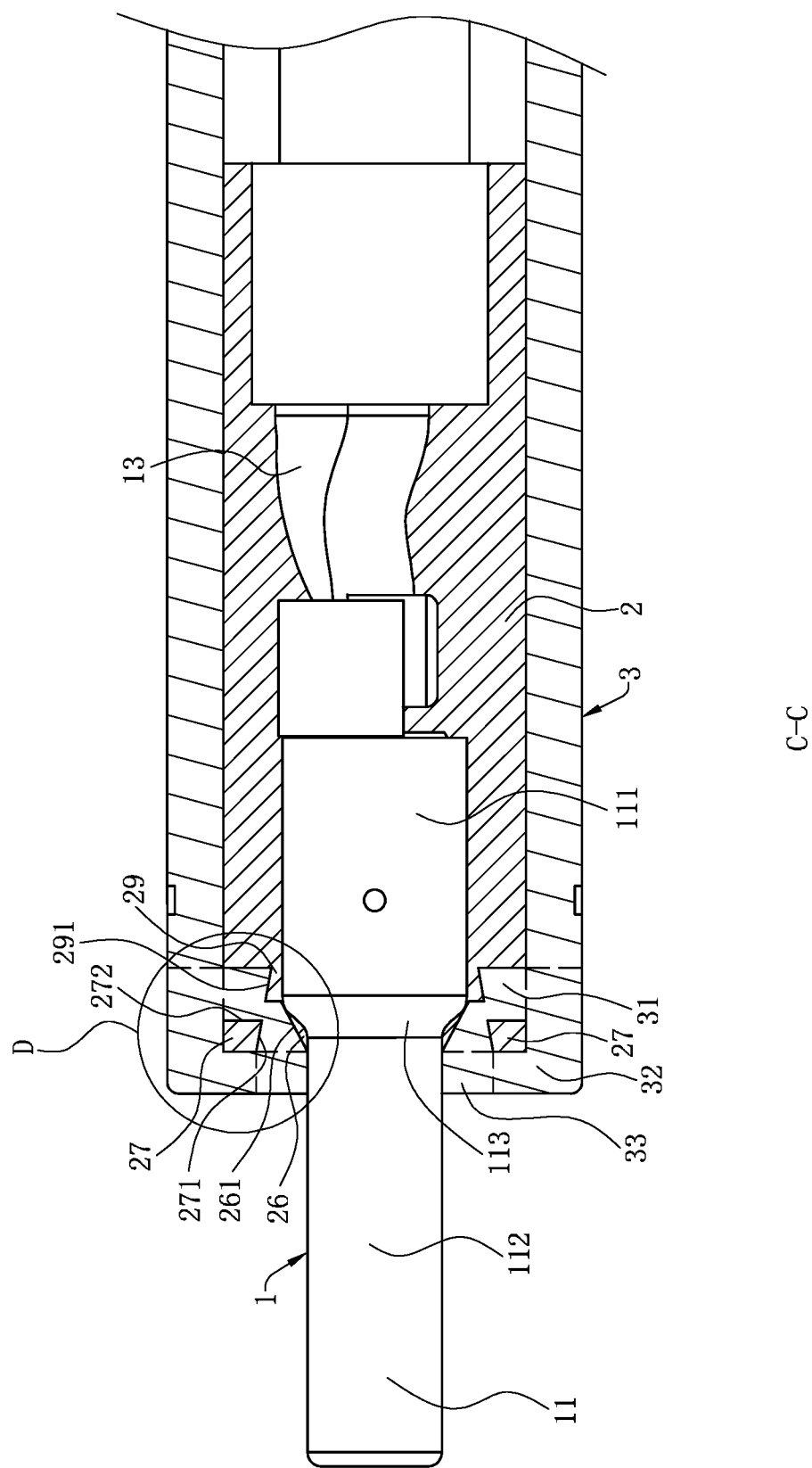
FIG. 7 is a sectional view of the inner shell and the outer shell in FIG. 6 along line C-C.
Figure 8:
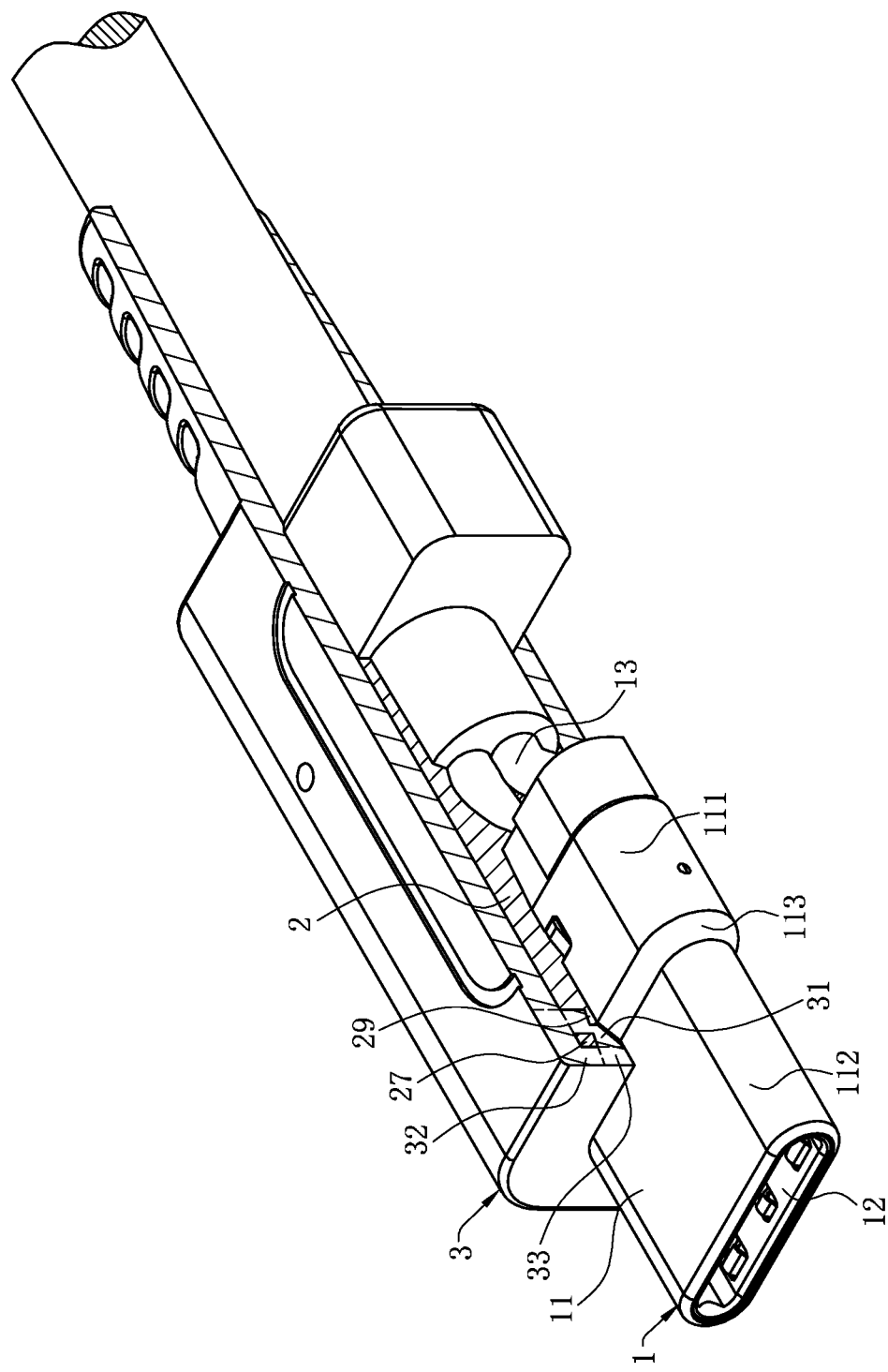
FIG. 8 is a perspective view of FIG. 7.

As shown in FIG. 5, FIG. 7 and FIG. 8, the second shell 3 has a clip portion 31 filled in the first slot 25 and the second slot 28. The clip portion 31 urges against the first fixing portion 26 toward a direction close to the connector module 1, such that the first fixing portion 26 stably abuts the step portion 113, and no opening is easily generated between the first fixing portion 26 and the connector module 1. The second fixing portion 27 stops the clip portion 31 from moving toward the direction away from the connector module 1. The clip portion 31 abuts the first abutting surface 271 and the second abutting surface 272 simultaneously, and the contact range of the clip portion 31 and the second fixing portion 27 is increased. Further, an included angle between a direction of the clip portion 31 abutting the first abutting surface 271 and a direction of the clip portion 31 abutting the second abutting surface 272 is less than 180 degrees, and the second fixing portion 27 may more effectively limit the position of the clip portion 31, such that the second fixing portion 27 more effectively stops the clip portion 31 from moving toward the direction away from the connector module 1, further preventing the clip portion 31 from moving toward the direction away from the connector module 1. The clip portion 31 is stably limited in the first slot 25 and the second slot 28, such that the clip portion 31 may stably urge against the first fixing portion 26 toward the direction close to the connector module 1, no opening is easily generated between the first fixing portion 26 and the connector module 1, the product has good water proof characteristics, and dust or other objects do not easily enter between the first shell 2 and the connector module 1 to affect the normal usage of the product, enhancing the appearance and quality of the product.

Figure 9:
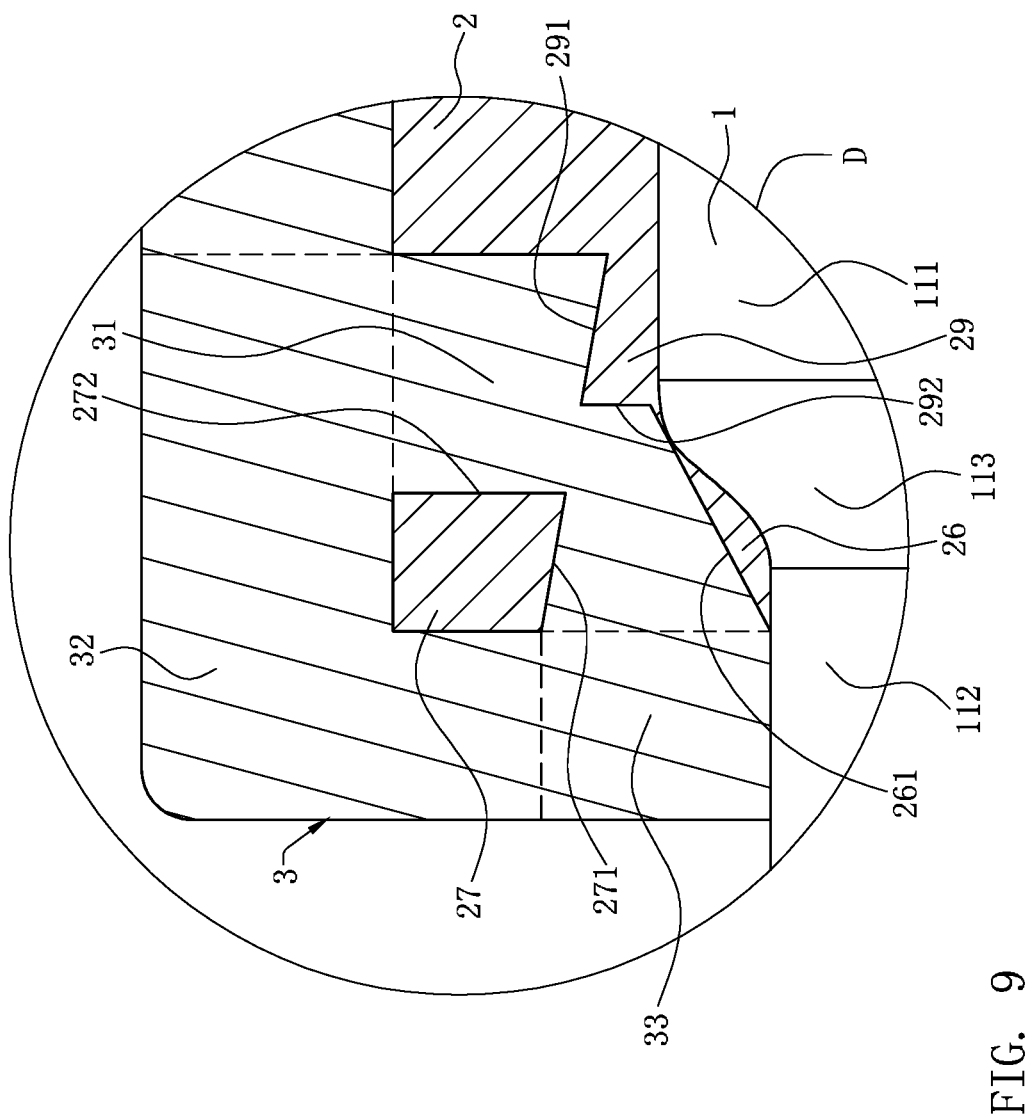
FIG. 9 is an enlarged view of a portion D in FIG. 7.

As shown in FIG. 7 to FIG. 9, the second shell 3 further has a combining portion 33 integrally connected to the clip portion 31. The combining portion 33 abuts the connector module 1. The second fixing portion 27 effectively stops the clip portion 31 from moving toward the direction away from the connector module 1. The combining portion 33 is integrally connected to the clip portion 31. Thus, the clip portion 31 in connection to the combining portion 33 do not move toward the direction away from the connector module 1. Therefore, no opening is generated between the combining portion 33 and the connector module 1, the product has good water proof characteristics, and dust or other objects do not easily enter between the second shell 3 and the connector module 1 to affect the normal usage of the product, enhancing the appearance and quality of the product.

As shown in FIG. 5, FIG. 7 and FIG. 9, the second shell 3 has a wrapping portion 32. The wrapping portion 32 is located outside the first shell 2, and has two end respectively integrally connected to the clip portion 31 and the combining portion 33. The clip portion 31 and the wrapping portion 32 match and surround to wrap the second fixing portion 27. The clip portion 31 abuts the second fixing portion 27 along two directions having an included angle less than 180 degrees, and the second fixing portion 27 reversely limits the position of the clip portion 31. Since the clip portion 31 and the wrapping portion 32 match and surround to wrap the second fixing portion 27, the second fixing portion 27 is limited by the clip portion 31 and the wrapping portion 32 in all directions. In contrast, the second fixing portion 27 more effectively stops the clip portion 31 and the wrapping portion 32 from moving toward the direction away from the connector module 1, such that the clip portion 31, the combining portion 33 and the wrapping portion 32 do not move toward the direction away from the connector module 1. The clip portion 31 stably urges against the first fixing portion 26 toward the direction close to the connector module 1, such that no opening is generated between the first fixing portion 26 and the connector module 1, no opening is generated between the combining portion 33 and the connector module 1, no opening is generated between the first shell 2 and the connector module 1 and between the second shell 3 and the connector module 1, the product has good water proof characteristics, and dust or other objects do not easily enter between the second shell 3 and the connector module 1 to affect the normal usage of the product, enhancing the appearance and quality of the product. In other embodiments, the second shell 3 may have no wrapping portion 32.

As shown in FIG. 5, FIG. 7 and FIG. 9, the front surface 21 and the top wall 22 of the first shell 2 are perpendicular to each other. The first slot 25 is formed by being concavely provided on the front surface 21, and the second slot 28 is formed by being concavely provided on the top wall 22. The first abutting surface 271 is connected to the front surface 21, and the second abutting surface 272 is connected to the top wall 22. The clip portion 31 is connected to other portions of the second shell 3 simultaneously from the front surface 21 of the first shell 2 and the top wall 22 of the first shell 2, which are two perpendicular surface, and the acting forces of the other portions of the second shell 3 to the clip portion 31 allow the clip portion 31 to stably limit the position of the second fixing portion 27. In contrast, the second fixing portion 27 more effectively stops the clip portion 31, and the clip portion 31 may stably urge against the first fixing portion 26 toward the direction close to the connector module 1, such that no opening is generated between the first fixing portion 26 and the connector module 1.

As shown in FIG. 5, FIG. 7 and FIG. 9, the guide surface 261, the first abutting surface 271 and the third abutting surface 291 are all provided obliquely relative to the surface of the connector module 1. The oblique surfaces facilitate the plastic material of the second shell 3 to fill in the first slot 25 and the second slot 28 completely. The included angle between the first abutting portion 271 and the second abutting portion 272 is an acute angle. That is, the included angle between the direction of the clip portion 31 abutting the first abutting portion 271 and the direction of the clip portion 31 abutting the second abutting portion 272 is an acute angle. The clip portion 31 abuts the second fixing portion 27 from two directions having an included angle as the acute angle, and the clip portion 31 stably limits the position of the second fixing portion 27. In contrast, the second fixing portion 27 more effectively stops the clip portion 31 from moving toward the direction away from the connector module 1, and the clip portion 31 stably urges against the first fixing portion 26 toward the direction close to the connector module 1, such that no opening is generated between the first fixing portion 26 and the connector module 1.

As shown in FIG. 5, FIG. 7 and FIG. 9, the third fixing portion 29 is integrally connected to the first fixing portion 26. The third abutting surface 291 is provided obliquely toward a direction close to the second shell 3. The clip portion 31 urges against the third abutting surface 291 toward the direction close to the connector module 1, such that no opening is easily generated between the third fixing portion 29 and the connector module 1, and further ensuring that no opening is easily generated between the first shell 2 and the connector module 1. Further, the third fixing portion 29 has a transition portion 292 connected to the first fixing portion 26. The transition portion 292 connects the third abutting surface 291 and the guide surface 261, such that the third abutting surface 291 and the guide surface 261 are on a same plane. The guide surface 261 and the first abutting surface 271 of the second fixing portion 27 are provided toward a direction away from the third abutting portion 291 and obliquely away from each other. Thus, the guide surface 261 and the first abutting surface 271 of the second fixing portion 27 are two surfaces opposite to each other. The abutting surface 271 of the second fixing portion 27 has a normal stopping effect to the clip portion 31, such that the clip portion 31 has a stronger urging force to the guide surface 261 toward the direction close to the connector module 1. Further, the third abutting surface 291 and the guide surface 261 are on a same plane, and the guide surface 261 and the third abutting surface 291 are both subject to the stronger urging force by the clip portion 31 toward the direction close to the connector module 1, further ensuring that no opening is generated between the first shell 2 and the connector module 1.

To sum up, the connector assembly 100 according to certain embodiments of the present invention has the following beneficial effects:

1. The clip portion 31 abuts the first abutting surface 271 and the second abutting surface 272 simultaneously, and the contact range of the clip portion 31 and the second fixing portion 27 is increased. Further, an included angle between a direction of the clip portion 31 abutting the first abutting surface 271 and a direction of the clip portion 31 abutting the second abutting surface 272 is less than 180 degrees, and the second fixing portion 27 may more effectively limit the position of the clip portion 31, such that the second fixing portion 27 more effectively stops the clip portion 31 from moving toward the direction away from the connector module 1, further preventing the clip portion 31 from moving toward the direction away from the connector module 1. The clip portion 31 is stably limited in the first slot 25 and the second slot 28, such that the clip portion 31 may stably urge against the first fixing portion 26 toward the direction close to the connector module 1, no opening is easily generated between the first fixing portion 26 and the connector module 1, the product has good water proof characteristics, and dust or other objects do not easily enter between the first shell 2 and the connector module 1 to affect the normal usage of the product, enhancing the appearance and quality of the product.

2. The second fixing portion 27 is limited by the clip portion 31 and the wrapping portion 32 in all directions. In contrast, the second fixing portion 27 more effectively stops the clip portion 31 and the wrapping portion 32 from moving toward the direction away from the connector module 1, such that the clip portion 31, the combining portion 33 and the wrapping portion 32 do not move toward the direction away from the connector module 1. The clip portion 31 stably urges against the first fixing portion 26 toward the direction close to the connector module 1, such that no opening is generated between the first fixing portion 26 and the connector module 1, no opening is generated between the combining portion 33 and the connector module 1, no opening is generated between the first shell 2 and the connector module 1 and between the second shell 3 and the connector module 1, the product has good water proof characteristics, and dust or other objects do not easily enter between the second shell 3 and the connector module 1 to affect the normal usage of the product, enhancing the appearance and quality of the product.

3. The clip portion 31 is connected to other portions of the second shell 3 simultaneously from the front surface 21 of the first shell 2 and the top wall 22 of the first shell 2, which are two perpendicular surface, and the acting forces of the other portions of the second shell 3 to the clip portion 31 allow the clip portion 31 to stably limit the position of the second fixing portion 27. In contrast, the second fixing portion 27 more effectively stops the clip portion 31, and the clip portion 31 may stably urge against the first fixing portion 26 toward the direction close to the connector module 1, such that no opening is generated between the first fixing portion 26 and the connector module 1.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A connector assembly, comprising:
a connector module;
a first shell, located outside the connector module, wherein the first shell has at least one first slot and at least one second slot, the first slot is in communication with the second slot, the first shell has a first fixing portion and a second fixing portion, the first fixing portion is close to the connector module relative to the second fixing portion, the second fixing portion has a first abutting surface and a second abutting surface, the first abutting surface forms a portion of the first slot, and the second abutting surface forms a portion of the second slot; and
a second shell, injection-molded outside the first shell, wherein the second shell has at least a clip portion filled in the first slot and the second slot, the clip portion urges against the first fixing portion toward a direction close to the connector module, the clip portion abuts the first abutting surface and the second abutting surface simultaneously, and an included angle between a direction of the clip portion abutting the first abutting surface and a direction of the clip portion abutting the second abutting surface is less than 180 degrees.

2. The connector assembly according to claim 1, wherein the second shell has a combining portion integrally connected with the clip portion, and the combining portion abuts the connector module.

3. The connector assembly according to claim 2, wherein the second shell has a wrapping portion, the wrapping portion is located outside the first shell and has two ends respectively integrally connected to the clip portion and the combining portion, and the clip portion and the wrapping portion match and surround to wrap the second fixing portion.

4. The connector assembly according to claim 1, wherein the first shell has a front surface and a top wall perpendicular to each other, the first slot is formed by being concavely provided on the front surface, the second slot is formed by being concavely provided on the top wall, the first abutting surface is connected to the front surface, and the second abutting surface is connected to the top wall.

5. The connector assembly according to claim 1, wherein the connector module comprises an insulating body, a plurality of terminals and a metal shell, the terminals are fixedly provided on the insulating body, the insulating body is accommodated in the metal shell, the first shell is injection-molded outside the metal shell, the first fixing portion abuts the metal shell, and the second shell partially abuts the metal shell.

6. The connector assembly according to claim 5, wherein the metal shell has a base and a mating portion configured to be inserted to a mating connector, an outer diameter of the base is greater than an outer diameter of the mating portion, a step portion connects the base and the mating portion, the step portion is provided obliquely relative to the mating portion, and the clip portion pushes the first fixing portion to urge against the step portion.

7. The connector assembly according to claim 6, wherein the first fixing portion has a guide surface, the clip portion abuts the guide surface, and an included angle between the step portion and the mating portion is greater than an included angle between the guide surface and the mating portion.

8. The connector assembly according to claim 1, wherein the included angle between the direction of the clip portion abutting the first abutting portion and the direction of the clip portion abutting the second abutting portion is an acute angle.

9. The connector assembly according to claim 1, wherein the first shell has a third fixing portion integrally connected to the first fixing portion, the third fixing portion has a third abutting portion provided obliquely toward a direction close to the second shell, the third abutting surface forms a portion of the second slot, and the clip portion urges against the third abutting surface toward a direction close to the connector module.

10. The connector assembly according to claim 9, wherein the first fixing portion has a guide surface, the third fixing portion has a transition portion connected to the first fixing portion, the transition portion connects the third abutting surface and the guide surface, the third abutting surface and the guide surface are on a same plane, and the guide surface and the first abutting surface are provided toward a direction away from the third abutting portion and obliquely away from each other.

\* \* \* \* \*